United States Patent
Asif

(10) Patent No.: US 11,027,783 B1
(45) Date of Patent: Jun. 8, 2021

(54) JOINT BETWEEN SIDEWALL AND ROOF PANEL OF TRAILER

(71) Applicant: Strick Trailers, LLC, Fairless Hills, PA (US)

(72) Inventor: Aaquib M. Asif, Fort Wayne, IN (US)

(73) Assignee: Strick Trailers, LLC, Fairless Hills, PA (US)

( * ) Notice: Subject to any disclaimer, the term of this patent is extended or adjusted under 35 U.S.C. 154(b) by 39 days.

(21) Appl. No.: 16/706,455

(22) Filed: Dec. 6, 2019

(51) Int. Cl.
  *B62D 33/04* (2006.01)
  *B60R 13/08* (2006.01)
  *B62D 27/02* (2006.01)

(52) U.S. Cl.
  CPC ............ *B62D 33/046* (2013.01); *B60R 13/08* (2013.01); *B62D 27/023* (2013.01)

(58) Field of Classification Search
  CPC ...... B62D 33/046; B62D 27/023; B60R 13/08
  USPC ...................................................... 296/182.1
  See application file for complete search history.

(56) References Cited

U.S. PATENT DOCUMENTS

| | | | | |
|---|---|---|---|---|
| 5,449,081 A | * | 9/1995 | Sjostedt | ............... B62D 29/045 220/1.5 |
| 5,507,405 A | * | 4/1996 | Thomas | ................... B60P 3/20 220/1.5 |
| 5,509,714 A | | 4/1996 | Schmidt | |
| 5,934,741 A | * | 8/1999 | Beukers | ............... B62D 29/046 296/181.6 |
| 5,997,076 A | * | 12/1999 | Ehrlich | ................... E04C 2/292 296/186.1 |
| 6,138,580 A | * | 10/2000 | Thoman | ............... B61D 17/045 105/396 |
| 6,220,651 B1 | * | 4/2001 | Ehrlich | ................... B62D 25/02 296/186.1 |
| 7,025,408 B2 | * | 4/2006 | Jones | ..................... B32B 27/06 296/186.1 |
| 7,353,960 B2 | * | 4/2008 | Seiter | ..................... B61D 17/18 105/355 |
| 2004/0217625 A1 | | 11/2004 | Graaff et al. | |
| 2010/0212248 A1 | * | 8/2010 | Huang | ..................... F16B 5/04 52/655.1 |
| 2011/0169301 A1 | | 7/2011 | Schmidt et al. | |
| 2016/0107706 A1 | * | 4/2016 | McCormack | .......... B62D 25/06 362/485 |

* cited by examiner

*Primary Examiner* — Pinel E Romain
(74) *Attorney, Agent, or Firm* — Keith Swedo

(57) ABSTRACT

A trailer includes a vertically-oriented sidewall, a horizontally-oriented roof panel disposed above the sidewall, and a top rail attached to the sidewall. At least a section of the top rail is disposed above the sidewall and below the roof panel. A substantially L-shaped cove has a horizontal leg attached to a lower surface of the roof panel, and a vertical leg attached to an inner surface of the sidewall. A board of thermal insulation includes an upper portion and a lower portion. The upper portion is disposed between the vertical leg of the cove and the section of the top rail, and the lower portion is disposed between the vertical leg of the cove and the sidewall.

20 Claims, 4 Drawing Sheets

JOINT BETWEEN SIDEWALL AND ROOF PANEL OF TRAILER

BACKGROUND

The present invention relates to a trailer, container, or other transport vehicle and, more particularly, to a joint between a sidewall and roof panel of such a trailer, container or transport vehicle (referred to as a "trailer" hereinafter). The interior of a trailer is often refrigerated to keep perishable food cold, or heated to prevent certain products such as beverages and paints from being damaged from freezing.

A problem is that trailers are typically not well insulated, which adds to the heating and cooling cost. Although the floor of the trailer is sometimes insulated, the joints between the sidewalls and roof panel are not insulated because of the irregular geometry of the joint, which does not accommodate a sheet of planar insulation. In addition, the joint may not be airtight, and thus may allow heat transfer through the joint via convection as well as via conduction. Accordingly, a large amount of heat may exit a heated trailer at the joints between the sidewalls and roof panel, and a large amount of heat may enter a refrigerated trailer at the joints between the sidewalls and roof panel.

Another problem is that the joints between the sidewalls and roof panel include fasteners such as rivets or nuts and bolts jutting out of the sidewall and into the interior of the trailer. When a trailer is tightly packed with cargo, the cargo may be damaged by the sharp edges of these fasteners.

SUMMARY

The present invention may provide a joint between a trailer sidewall and a roof panel that is thermally insulated and better sealed (i.e., more airtight). More particularly, a board of thermal insulation may be positioned over the horizontally-oriented interface between the sidewall and the top rail, thereby reducing air flow through the interface and reducing heat transfer via conduction through the sidewall and top rail. An L-shaped bracket or cove includes a first leg that is horizontally-oriented and attached to the roof panel. A second leg is vertically-oriented and covers the board of insulation. A lower end of the second leg extends down beyond the lower edge of the board of insulation and angles laterally to abut the sidewall, where the lower end of the second leg is attached to the sidewall.

The invention comprises, in one form thereof, a trailer including a vertically-oriented sidewall, a horizontally-oriented roof panel disposed above the sidewall, and a top rail attached to the sidewall. At least a section of the top rail is disposed above the sidewall and below the roof panel. A substantially L-shaped cove has a horizontal leg attached to a lower surface of the roof panel, and a vertical leg attached to an inner surface of the sidewall. A board of thermal insulation includes an upper portion and a lower portion. The upper portion is disposed between the vertical leg of the cove and the section of the top rail, and the lower portion is disposed between the vertical leg of the cove and the sidewall.

The invention comprises, in another form thereof, a trailer including a vertically-oriented sidewall, a horizontally-oriented roof panel disposed above the sidewall, and a top rail attached to the sidewall. The top rail is disposed at least partially above the sidewall and at least partially below the roof panel. There is an air gap between the sidewall and the top rail. The air gap is fluidly connected to ambient air. A substantially L-shaped cove has a horizontal leg attached to a lower surface of the roof panel, and a vertical leg attached to an inner surface of the sidewall. The cove blocks air flow through the air gap between an interior of the trailer and an exterior of the trailer. A board of thermal insulation includes an upper portion and a lower portion. The upper portion is disposed between the vertical leg of the cove and the top rail. The lower portion is disposed between the vertical leg of the cove and the sidewall such that the board of thermal insulation covers the air gap.

The invention comprises, in yet another form thereof, a trailer including a vertically-oriented sidewall, a horizontally-oriented roof panel disposed above the sidewall, and a top rail attached to the sidewall. At least a section of the top rail is disposed above the sidewall and below the roof panel. A substantially L-shaped cove has a horizontal leg attached to a lower surface of the roof panel, and a vertical leg attached to an inner surface of the sidewall. A board of thermal insulation includes an upper portion and a lower portion. The upper portion is disposed between the vertical leg of the cove and the section of the top rail. The lower portion is disposed between the vertical leg of the cove and the sidewall. A first fastener is attached to the section of the top rail and juts from the section of the top rail toward an interior of the trailer. The board of thermal insulation and the vertical leg of the cove cover the first fastener. A second fastener is attached to the sidewall and juts from the sidewall toward an interior of the trailer. The board of thermal insulation at least partially covers the second fastener. The vertical leg of the cove covers the second fastener.

An advantage of the present invention is that the interior of the trailer is better thermally insulated, thereby reducing heat transfer into or out of the trailer.

Another advantage of the present invention is that the cove may improve support for the roof panels.

Yet another advantage of the present invention is that the cove may cover through fasteners that jut out horizontally from the interior surfaces of the sidewall and the top rail, thereby protecting cargo from damage from these fasteners, and reducing the thermal loss from the through fasteners that the cove covers.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
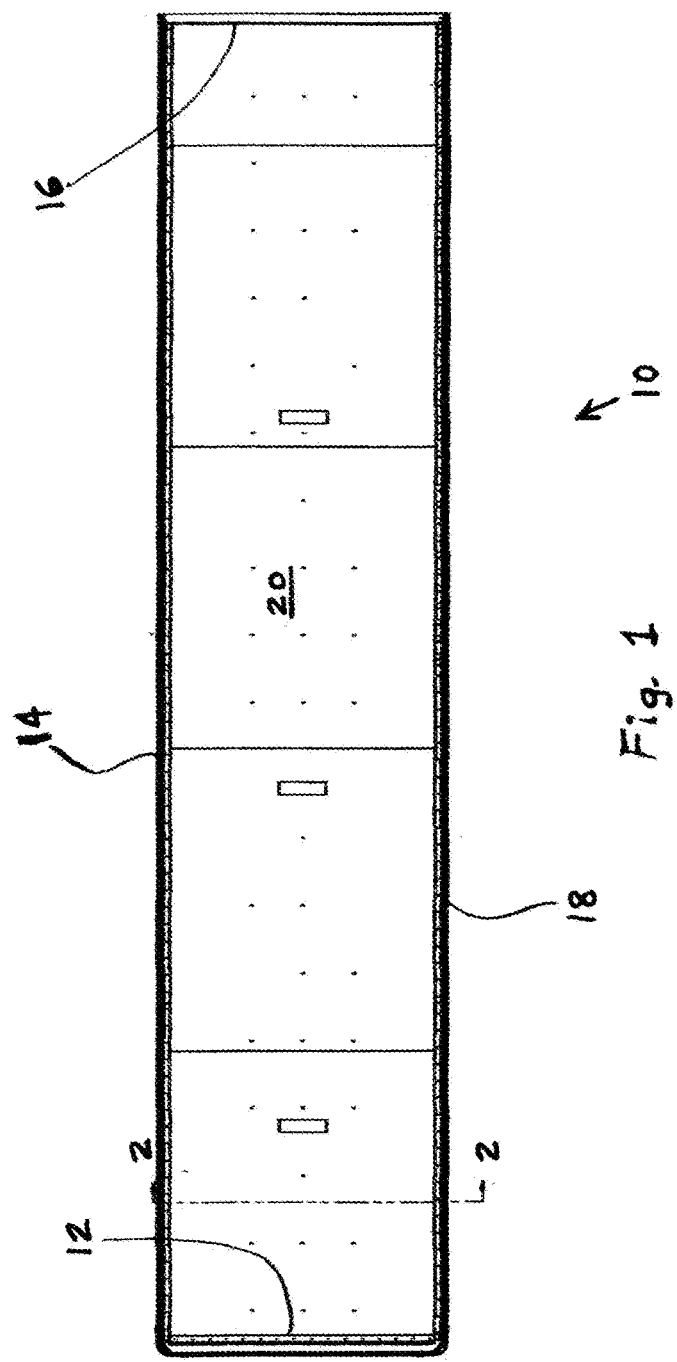
FIG. 1 is an overhead plan view of one embodiment of a trailer of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring to the drawings, wherein like numerals indicate like elements, FIG. 1 illustrates one embodiment of a trailer 10 of the present invention. Trailer 10 includes a front wall 12, a right sidewall 14, a rear wall 16, a left sidewall 18, and a roof panel 20.

Figure 2:
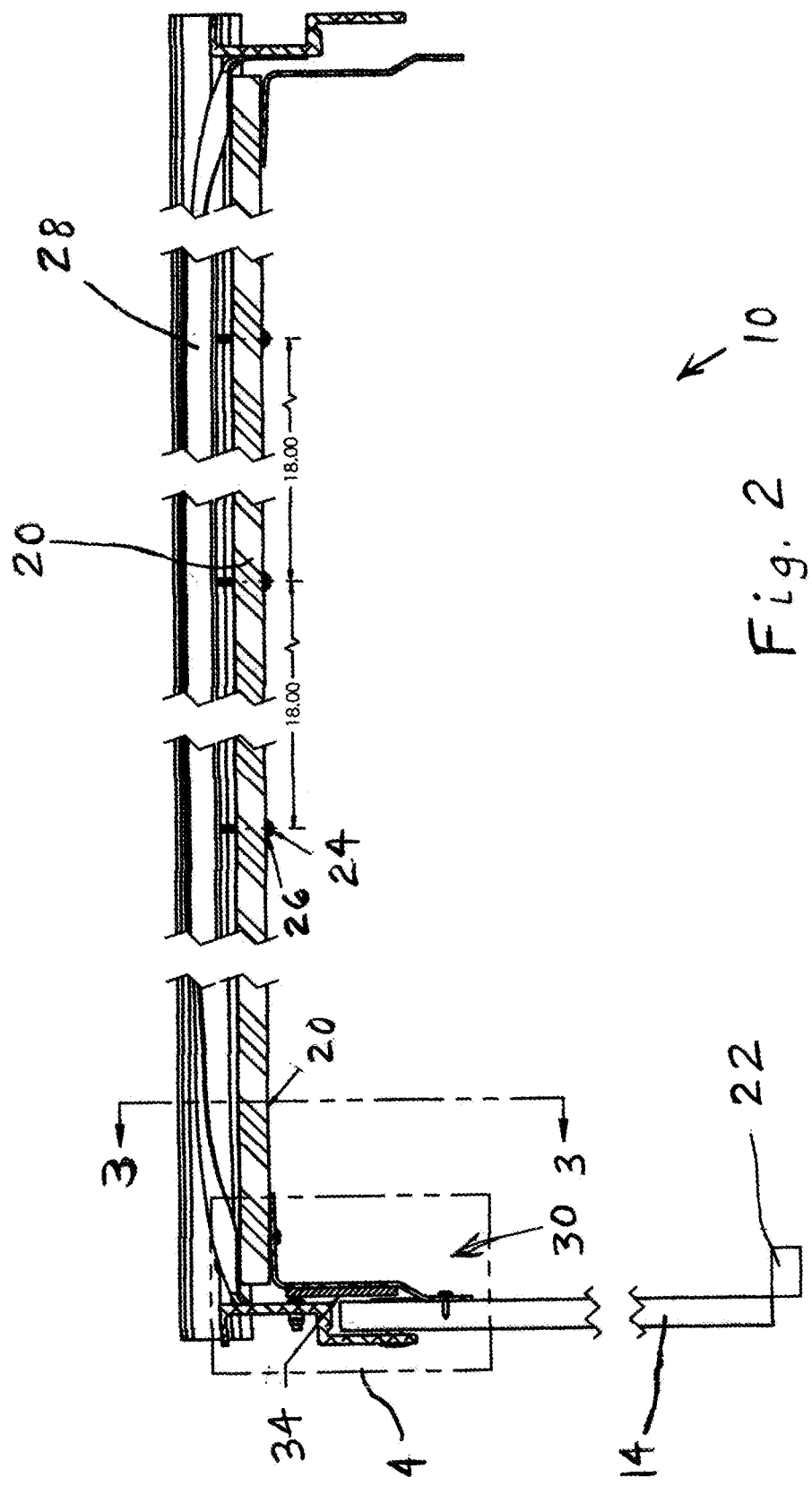
FIG. 2 is a fragmentary front sectional view of the trailer of FIG. 1 along line 2-2.

As shown in FIG. 2, trailer 10 further includes a floor hat 22. Roof panel 20 includes screws 24 and washers 26 intermittently across its width to attach roof panel 20 to roof bows 28.

A joint 30 in area 4 interconnects right sidewall 14 and roof panel 20. A similar joint 30 interconnects left sidewall 18 and roof panel 20, although this joint is not shown in its entirety in FIG. 2.

Figure 3:
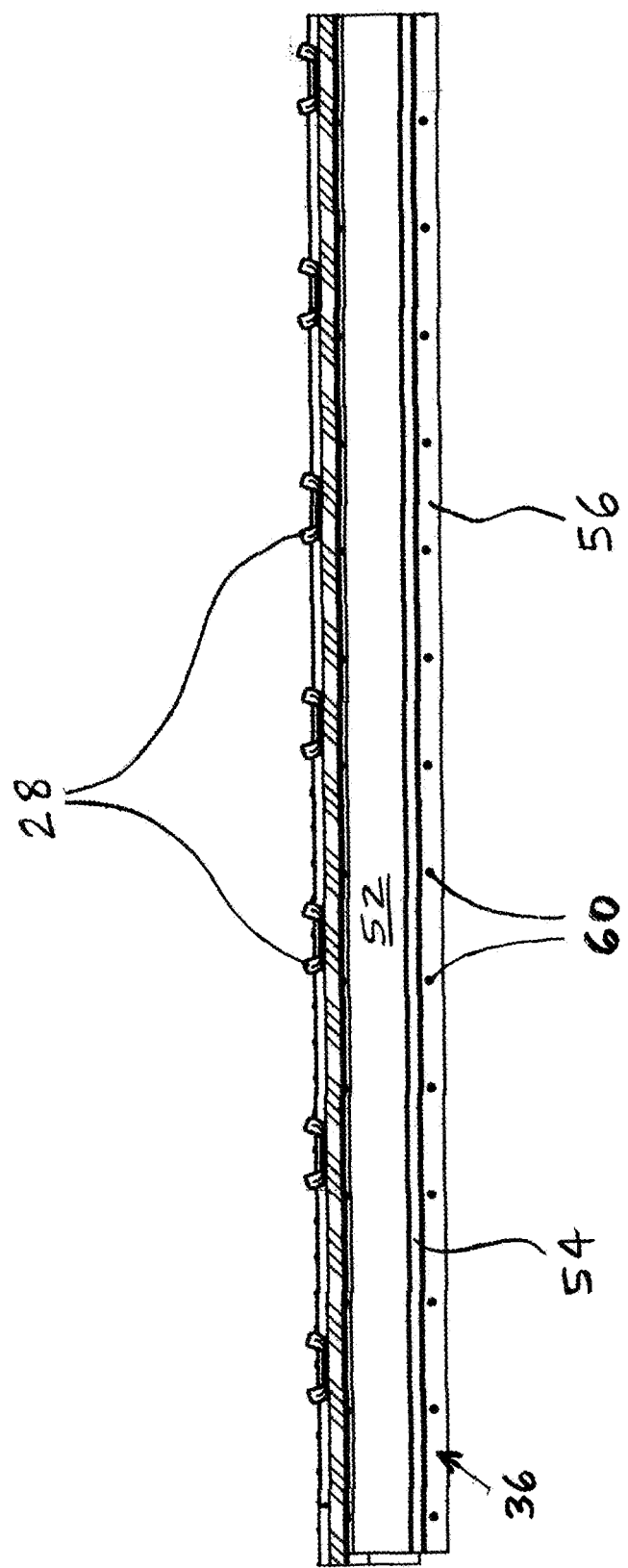
FIG. 3 is a fragmentary side sectional view of the trailer of FIG. 2 along line 3-3.

As shown in FIG. 3, roof bows 28 may be evenly spaced from each other along the length of trailer 10, and may be parallel to each other. Roof bows 28 may provide structural support to roof panel 20.

Figure 4:
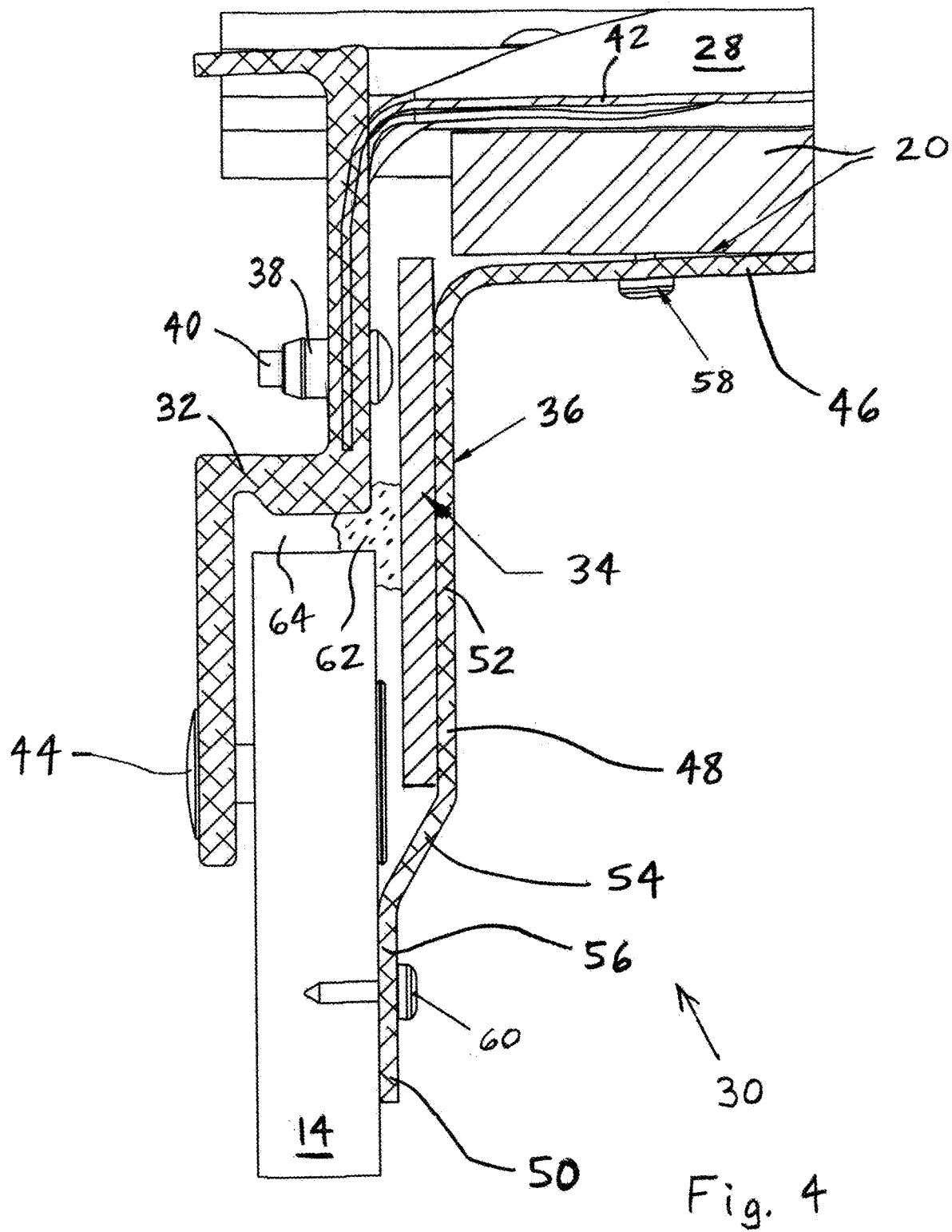
FIG. 4 is an enlarged view of area 4 of FIG. 2.

Joint 30 is shown in more detail in FIG. 4, and includes right sidewall 14, a right top rail 32, roof panel 20, a board of thermal insulation 34, and an L-shaped cove 36. A nut 38 and bolt 40 attaches a sheet of flexible plastic insulation 42 to right top rail 32. A rivet 44 attaches right sidewall 14 to right top rail 32. Although not apparent in FIG. 4, rivets may be spaced apart along the lengths of right sidewall 14 and right top rail 32 such that ambient air may flow between rivets 44 and reach board of insulation 34 and cove 36. However, insulation 34 and cove 36 may provide a substantially airtight seal to prevent the ambient air from entering the interior of trailer 10.

Cove 36 includes a first leg 46 that is substantially planar, horizontally-oriented and attached to roof panel 20. Cove 36 may provide substantial structural support of roof panel 20. A second leg 48 is vertically-oriented and covers board of insulation 34.

A lower end 50 of second leg 48 extends down beyond the lower edge of board of insulation 34 and angles laterally to abut sidewall 14, where lower end 50 of second leg 48 is attached to sidewall 14. Second leg 48 includes a proximal body 52 which is attached to distal end 50 and to first leg 46. Both proximal body 52 and board of insulation 34 cover bolt 40 and protect cargo inside trailer 10 from being damaged by bolt 40.

Lower end 50 includes an angled segment 54 and a distal tip 56. Board of insulation 34, proximal body 52, and angled segment 54 conjunctively cover rivet 44 and protect cargo inside trailer 10 from being damaged by rivet 44. Angled segment 54 may be oriented at an angle of approximately between 135 degrees and 165 degrees relative to proximal body 52, and relative to distal tip 56. In a particular embodiment, angled segment 54 may be oriented at an angle of approximately 150 degrees relative to proximal body 52, and relative to distal tip 56. Distal tip 56 may be parallel to proximal body 52, A set of first screws 58 are aligned along the length of cove 36 and attach first leg 46 to roof panel 20. A set of second screws 60 are aligned along the length of cove 36 and attach distal tip 56 to right sidewall 14. Although screws 60 may extend into the interior of the trailer, screws 60 do not bear as much weight load as nuts 38/bolts 40 or rivets 44, and thus may have a smaller profile jutting into the interior of the trailer. Also because of the smaller weight load, screws 60 may be less numerous than nuts 38/bolts 40 or rivets 44.

Board of insulation 34 may be adhered to proximal body 52 of cove 36. Alternatively, board of insulation 34 may be sandwiched between proximal body 52 and the combination of right top rail 32 and right sidewall 14. Angled segment 54 may support board of insulation 34 and maintain board 34 at a fixed vertical level.

An air gap 64 between top rail 32 and sidewall 14 may be fluidly connected to and in fluid communication with ambient air outside of trailer 10. In another embodiment, insulation 62 may be blown into air gap 64. Board of insulation 34 and cove 36 may secure insulation 62 and retain insulation 62 in place to ensure that none of insulation 62 breaks off and falls into the interior of trailer 10.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A trailer, comprising:
   a vertically-oriented sidewall;
   a horizontally-oriented roof panel disposed above the sidewall;
   a top rail attached to the sidewall, at least a section of the top rail being disposed above the sidewall and below the roof panel;
   a substantially L-shaped cove having a horizontal leg attached to and supporting a lower surface of the roof panel, and a vertical leg attached to an inner surface of the sidewall; and
   a board of thermal insulation including an upper portion and a lower portion, the upper portion being disposed between the vertical leg of the cove and the section of the top rail, and the lower portion being disposed between the vertical leg of the cove and the sidewall.

2. The trailer of claim 1 wherein the vertical leg of the cove includes a proximal body, an angled segment attached to a lower end of the proximal body, and a distal tip attached to a lower end of the angled segment, the upper portion of the board of thermal insulation being disposed between the proximal body of the vertical leg and the section of the top rail, and the lower portion being disposed between the proximal body of the vertical leg and the sidewall, the distal tip of the vertical leg being attached to the sidewall.

3. The trailer of claim 2 wherein the distal tip of the vertical leg is substantially planar, the distal tip of the vertical leg being parallel to and laterally offset from the proximal body of the vertical leg.

4. The trailer of claim 3 wherein the angled segment of the vertical leg is oriented at an angle of approximately between 135 degrees and 165 degrees relative to the proximal body of the vertical leg and relative to the distal tip of the vertical leg.

5. The trailer of claim 4 wherein the angled segment of the vertical leg is oriented at an angle of approximately 150 degrees relative to the proximal body of the vertical leg and relative to the distal tip of the vertical leg.

6. The trailer of claim 1 further comprising a fastener attached to the section of the top rail and jutting from the section of the top rail toward an interior of the trailer, the vertical leg of the cove covering the fastener.

7. The trailer of claim 1 further comprising a fastener attached to the sidewall and jutting from the sidewall toward an interior of the trailer, the vertical leg of the cove covering the fastener.

8. The trailer of claim 1 wherein there is an air gap between the sidewall and the top rail, the trailer further comprising blown insulation in the air gap, the vertical leg of the cove covering the blown insulation.

9. The trailer of claim 1 wherein there is an air gap between the sidewall and the top rail, the air gap being fluidly connected to ambient air, the cove substantially sealing an interior of the trailer from the air gap.

10. A trailer, comprising:
a vertically-oriented sidewall;
a horizontally-oriented roof panel disposed above the sidewall;
a top rail attached to the sidewall, the top rail being disposed at least partially above the sidewall and at least partially below the roof panel, wherein there is an air gap between the sidewall and the top rail, the air gap being fluidly connected to ambient air;
a substantially L-shaped cove having a horizontal leg attached to a lower surface of the roof panel, and a vertical leg attached to an inner surface of the sidewall, the cove blocking air flow between an interior of the trailer and an exterior of the trailer through the air gap; and
a board of thermal insulation including an upper portion and a lower portion, the upper portion being disposed between the vertical leg of the cove and the top rail, and the lower portion being disposed between the vertical leg of the cove and the sidewall such that the board of thermal insulation covers the air gap.

11. The trailer of claim 10 wherein the vertical leg of the cove includes a proximal body, an angled segment attached to a lower end of the proximal body, and a distal tip attached to a lower end of the angled segment, the upper portion of the board of thermal insulation being disposed between the proximal body of the vertical leg and the top rail, and the lower portion being disposed between the proximal body of the vertical leg and the sidewall, the distal tip of the vertical leg being attached to the sidewall.

12. The trailer of claim 11 wherein the distal tip of the vertical leg is substantially planar, the distal tip of the vertical leg being parallel to and laterally offset from the proximal body of the vertical leg.

13. The trailer of claim 12 wherein the angled segment of the vertical leg is oriented at an angle of approximately between 135 degrees and 165 degrees relative to the proximal body of the vertical leg and relative to the distal tip of the vertical leg.

14. The trailer of claim 13 wherein the angled segment of the vertical leg is oriented at an angle of approximately 150 degrees relative to the proximal body of the vertical leg and relative to the distal tip of the vertical leg.

15. The trailer of claim 10 further comprising a fastener attached to the top rail and jutting from the top rail toward an interior of the trailer, the vertical leg of the cove covering the fastener.

16. The trailer of claim 10 further comprising a fastener attached to the sidewall and jutting from the sidewall toward an interior of the trailer, the vertical leg of the cove covering the fastener.

17. The trailer of claim 10 further comprising blown insulation in the air gap, the board of thermal insulation covering the blown insulation.

18. A trailer, comprising:
a vertically-oriented sidewall;
a horizontally-oriented roof panel disposed above the sidewall;
a top rail attached to the sidewall, at least a section of the top rail being disposed above the sidewall and below the roof panel;
a substantially L-shaped cove having a horizontal leg attached to a lower surface of the roof panel, and a vertical leg attached to an inner surface of the sidewall;
a board of thermal insulation including an upper portion and a lower portion, the upper portion being disposed between the vertical leg of the cove and the section of the top rail, and the lower portion being disposed between the vertical leg of the cove and the sidewall;
a first fastener attached to the section of the top rail and jutting from the section of the top rail toward an interior of the trailer, the board of thermal insulation and the vertical leg of the cove covering the first fastener; and
a second fastener attached to the sidewall and jutting from the sidewall toward an interior of the trailer, the board of thermal insulation at least partially covering the second fastener, the vertical leg of the cove covering the second fastener.

19. The trailer of claim 18 wherein the vertical leg of the cove includes a proximal body, an angled segment attached to a lower end of the proximal body, and a distal tip attached to a lower end of the angled segment, the upper portion of the board of thermal insulation being disposed between the proximal body of the vertical leg and the section of the top rail, and the lower portion being disposed between the proximal body of the vertical leg and the sidewall, the distal tip of the vertical leg being attached to the sidewall.

20. The trailer of claim 19 wherein the distal tip of the vertical leg is substantially planar, the distal tip of the vertical leg being parallel to and laterally offset from the proximal body of the vertical leg.

\* \* \* \* \*